United States Patent [19]

Walker

[11] 4,322,672

[45] Mar. 30, 1982

[54] ELECTRIC MOTOR CONTROL APPARATUS

[75] Inventor: Donald F. Walker, West Lothian, Scotland

[73] Assignee: Ferranti Limited, Gatley, England

[21] Appl. No.: 94,827

[22] Filed: Nov. 16, 1979

[30] Foreign Application Priority Data

Nov. 22, 1978 [GB] United Kingdom ............... 45536/78

[51] Int. Cl.³ ........................... H02P 5/34; H02P 7/42
[52] U.S. Cl. .................................. 318/800; 318/799; 318/805; 318/808; 318/812; 318/807
[58] Field of Search ....................... 318/729, 798–801, 318/802–803, 805, 810, 811, 808, 812, 807

[56] References Cited

U.S. PATENT DOCUMENTS

| | | | |
|---|---|---|---|
| 3,896,348 | 7/1975 | Loderer | 318/798 |
| 3,962,614 | 6/1976 | Rettig | 318/801 |
| 4,052,648 | 10/1977 | Nola | 318/805 |
| 4,088,934 | 5/1978 | D'Atre et al. | 318/802 |
| 4,158,801 | 6/1979 | Hirata | 318/801 |

*Primary Examiner*—J. V. Truhe
*Assistant Examiner*—Eugene S. Indyk
*Attorney, Agent, or Firm*—Kerkam, Stowell, Kondracki & Clarke

[57] ABSTRACT

Electric motor control apparatus includes a variable-frequency oscillator 10, a counter 11 clocked by the oscillator, and signal generating means 12 arranged to generate two sinusoidal voltages in quadrature with one another. The two voltages are applied through separate amplifiers 22, 23 to separate stator windings 24, 26, of the motor, the stator windings being 90° apart. Control means includes a bistable circuit 28 producing a signal lagging 45° behind one sinusoidal voltage, and a phase sensitive detector 29 arranged to vary the frequency of the oscillator 10 to maintain a constant phase difference.

8 Claims, 4 Drawing Figures

ELECTRIC MOTOR CONTROL APPARATUS

This invention relates to electric motor control apparatus, and in particular to such apparatus for controlling A.C. induction motors.

A.C. induction motors of the type having a low resistance rotor have a characteristic in which the stall or starting torque may be only a fraction of the maximum torque. In addition, if speed control is carried out by frequency variation, the losses in the motor increase considerably with the increase in frequency due to increased iron and copper losses. If an A.C. induction motor of conventional type is to be used in a servo system voltage control does not give an entirely satisfactory performance, particularly in terms of power dissipation and acceleration. However, an a.c. servo motor, with its high rotor resistance, also has unsatisfactory characteristics.

It is an object of the invention to provide electric motor control apparatus to enable a conventional a.c. induction motor to develop the maximum possible torque whilst at the same time enabling it to operate satisfactorily as a servo motor.

According to the present invention there is provided electric motor control apparatus for an alternating current induction motor having a low resistance rotor and two stator windings 90° apart, which includes a variable frequency oscillator, a counter clocked by the output of the oscillator, signal generating means responsive to the counter output to generate two sinusoidal voltages in quadrature with one another, amplifier means operable to apply each sinusoidal voltage to a separate one of the stator windings under constant current conditions, and control means operable to vary the frequency of the two sinusoidal voltages in such a manner that the torque developed by the motor remains substantially constant despite changes in the speed of rotation of the motor.

In one embodiment of the invention the control means is operable to compare the phase of the voltage applied across one stator winding with the phase of the current flowing in that winding and to vary the frequency of the variable frequency oscillator to maintain a constant phase difference.

The invention will now be described with reference to the accompanying drawings, in which.

Figure 1:
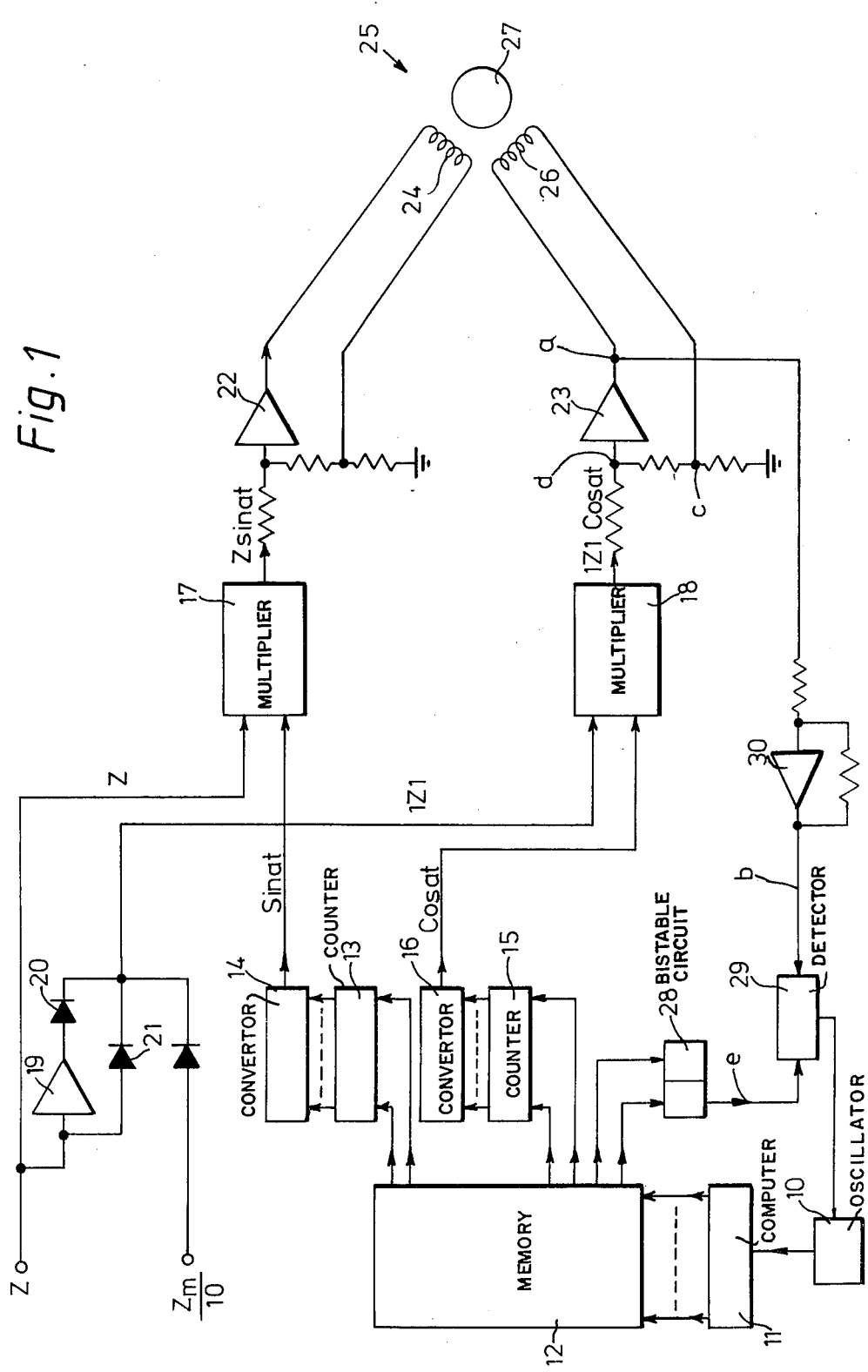
FIG. 1 is a schematic circuit diagram of a first embodiment.

The theory upon which the invention is based relies very largely on the conventional characteristics of an a.c. induction motor for which the torque T at any time is given by the expression $$T \alpha \phi_s \cdot I_R \cdot \cos \theta \quad (1)$$

where $\phi$ is the stator flux
$I_R$ is the rotor current
$\theta$ is the phase angle between the rotor current and the induced rotor emf $E_R$
now $\cos \theta$ is given by the expression $$\cos \theta = \frac{R_R}{\sqrt{R_R^2 + S^2 X_R^2}} \quad (2)$$

where $R_R$ is the rotor resistance
$X_R$ is the rotor reactance
S is the slip
further, the slip S is given by $$S = (f - n)/f \quad (3)$$

where f is the supply frequency in Hz and n is the running speed.

The induced rotor emf $E_R$ for a stator emf $E_s$ is given by $$E_R = S \cdot K \cdot E_s \quad (4)$$

where K is a constant winding factor and $$E_s \alpha \phi_s f \quad (5)$$

From equation (4) the rotor current $I_R$ is given by $$I_R = \frac{S \cdot K \cdot E_s}{\sqrt{R_R^2 + S^2 X_R^2}} \quad (6)$$

Thus substituting from equations (2), (5) and (6) into equation (1)

$$T \alpha \frac{E_s}{f} \cdot \frac{S K E_s}{\sqrt{R_R^2 + S^2 X_R^2}} \cdot \frac{R_R}{\sqrt{R_R^2 + S^2 X_R^2}} \quad (7)$$

This has a maximum value if $$R_R = S X_R \quad (8)$$

However, from equations 2 and 8, if $R_R = S X_R$, then $$\cos \theta = \frac{R_R}{\sqrt{R_R^2 + R_R^2}}$$

$$= \frac{R_R}{\sqrt{2 R_R^2}}$$

$$= \frac{1}{\sqrt{2}}$$

or $\theta = 45°$

Hence maintaining $\theta$ at 45° will ensure that $R_R = S X_R$ and hence that the torque remains at a maximum value.

As already stated, $\theta$ is the phase angle between the rotor current $I_R$ and the induced rotor emf $E_R$. It is not possible, with a squirrel cage rotor, to measure either the current or emf in the rotor, and it is therefore necessary to find other parameters which are sufficiently accurate representations of these quantities. A reasonable approximation to $\cos \theta$ may be obtained by comparing the supply or stator current $I_S$ with the stator emf $E_S$.

Referring now to FIG. 1, a variable-frequency oscillator 10 provides a clock input to a counter 11. The outputs of the counter stages form the input to a read-only memory 12. The read-only memory contains a series of values which generate in discrete steps two sinusoidal waveforms in quadrature, in other words a sine waveform and a cosine waveform. The increments of the sine waveform are passed to a counter 13 the output of which are connected to a digital-to-analogue convertor 14. Similarly the increments of the cosine waveform are passed to a counter 15 and thence to a digital-to-analogue convertor 16. The outputs of the two convertors 14 and 16 are respectively the sine and cosine waveforms. Each of these is applied to a multiplying circuit, the sine waveform to multiplier 17 and the cosine waveform to multiplier 18.

The control input Z, which is a d.c. signal of variable amplitude and polarity, is applied to the multiplier 17 as the multiplying factor. A network comprising a unity-gain inverting amplifier 19 and diodes 20 and 21, to which the control input is also applied, delivers an output which is the modulus of Z, that is it has the same amplitude but is of constant polarity. This is applied to the multiplier 18 as the multiplying factor.

The output of multiplier 17 is thus a waveform of the type Zsinat, whilst the output of multiplier 18 is a waveform of the type Zcosat. These two waveforms are applied respectively to power amplifiers 22 and 23, each operating in the constant current mode by virtue of the current feedback connected to each input. Power amplifier 22 has its output connected to one stator winding 24 of the induction motor 25, whilst power amplifier 23 has its output connected to the other stator winding 26. The squirrel cage rotor of the motor 26 is shown diagrammatically at 27.

In order to prevent the output from multiplier 18 from ever becoming zero a small constant multiplying factor is also applied. As shown in FIG. 1 this is one-tenth of the maximum value that can be attained by the control input Z, or $Z_M/10$.

The read-only memory 12, as well as generating the sine and cosine waveforms, also produces pulse timing markers 45° after the zero-crossings of the cosine waveform, and these outputs are applied to a bistable circuit 28 which thus produces a square-wave output lagging by 45° on the cosine waveform. This square-wave reference waveform is applied to one input of a phase-sensitive detector 29. The other input to the phase-sensitive detector 29 is obtained from the output of the power amplifier 23 and is therefore in phase with the motor cosine supply voltage. This is applied to the detector 29 by way of an inverting buffer amplifier 30.

As stated earlier, the phase comparison required is that between rotor current and rotor induced emf, but a sufficiently accurate approximation may be obtained by comparing values of stator current and stator emf. Instead of using a phase comparison system which maintains a 45° phase angle difference, it is simpler to alter the phase of the reference component by 45° and maintain a 0° or 90° phase angle. Hence the reference voltage waveform produced by the bistable circuit 28 is provided, lagging by 45° on the voltage in the cosine waveform supply to the stator winding 26.

Figure 2:
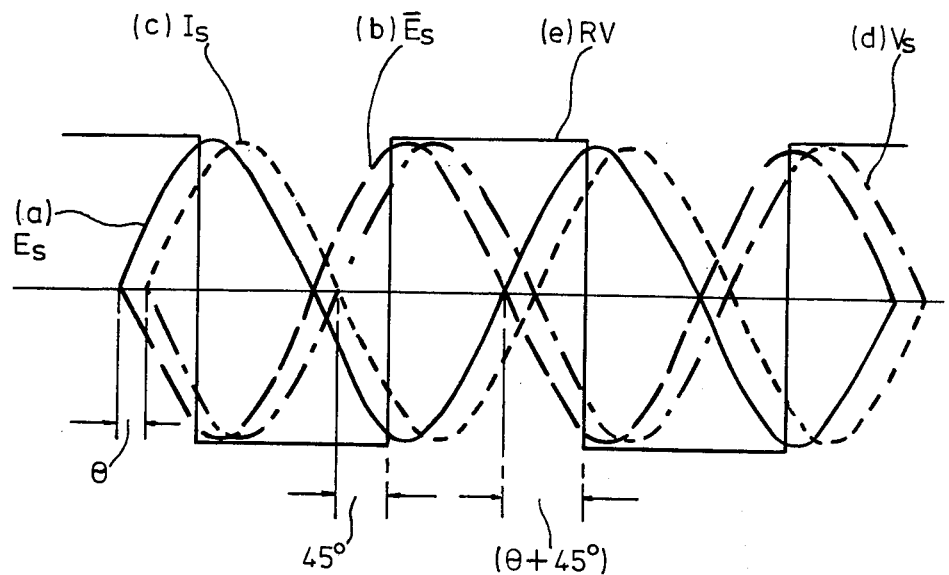
FIG. 2 illustrates the current and voltage waveform at various points in the circuit.

FIG. 2 illustrates the actual waveform appearing at various points on the circuit of FIG. 1. The waveform at (a) represents the supply voltage $E_s$ to the stator winding being considered. In fact, the voltage applied to the phase-sensitive detector 29 is the inverse of this, as shown at (b), due to the inverting action of the amplifier 30.

A separate winding on the stator may be used to measure the back emf, instead of the supply, if greater accuracy is required for the control. The stator current $I_s$ is measured at point (c) and lags behind the stator voltage $E_s$ by the phase angle $\theta$ as shown.

The voltage supplied to the power amplifier 23 from the multiplier 18 is in phase with the generated cosine waveform and is represented by Vs measured at point (d). This voltage is 180° out of phase with the stator current $I_s$, and leads by 45° the reference square-wave voltage RV measured at point (e). The actual phase comparison carried out is between RV and $\overline{E_s}$, and the phase-sensitive detector operates to provide an output indicative of the magnitude and sense of any deviation from a 90° phase difference with $\overline{E_s}$ leading RV. In this situation, as shown in FIG. 2, the phase angle between $E_s$ and RV is $(\theta+45°)$ and hence $\theta$ is 45° as required.

In operation, when the control circuit is switched on the motor will be at rest, and hence, in the presence of a control signal Z, the stator current $I_s$ will lag behind the stator voltage $E_s$ by almost 90°. The frequency of the variable frequency oscillator will initially by a maximum, but will be reduced by the output from the phase sensitive detector until the desired 45° phase relationship is achieved. Any change in load will result in a speed change and hence affect the phase difference, causing the frequency of the oscillator to change. Hence the control circuit operates to vary the frequency of the two supply voltages to the stator windings so as to maintain the maximum torque condition.

If the control signal Z changes sign, then the output of the multiplier 17 will change sign but that of multiplier 18 will not. This results in a reversal of one phase winding and hence reverses the direction of rotation of the motor.

The application to the multiplier 18 of a minimum control signal Zm/10 prevents the current output of power amplifier 23 from falling to zero even when the control signal Z is zero.

The theory set out earlier also leads to an alternative method of controlling the motor to operate under maximum torque conditions. It will be seen that for maximum torque $R_R = SX_R$. The reactance $X_R$ is equal to $2\pi fL_R$, where $L_R$ is the inductance of the rotor, and is constant. Hence the condition for maximum torque is $$R = 2\pi fL \cdot S$$

or $$fS = R/2\pi L$$

now, from equation (3), $$f = n + Sf,$$

and hence for maximum torque $$f = n + R/2\pi L$$

This means that by measuring the speed of rotation of the motor and adding to a signal representing this speed a second constant signal representing the quantity $R/2\pi L$, the frequency of the variable frequency oscillator may be controlled directly.

Figure 3:
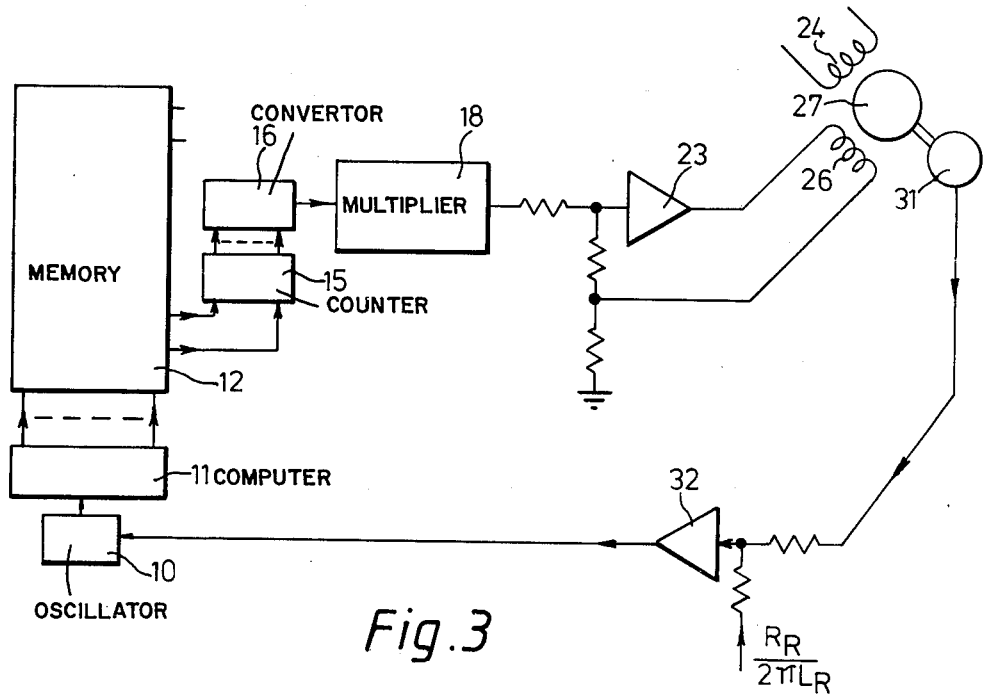
FIG. 3 shows part of a schematic circuit diagram of a second embodiment.

FIG. 3 is a schematic circuit diagram of part of the necessary circuitry, the remainder being the same as in FIG. 1. Amplifier 30, phase-sensitive detector 29 and bistable circuit 28 of FIG. 1 have been removed, and a tachogenerator 31 and summing amplifier 32 provided in their place. As in the first embodiment, the circuit operates to adjust the frequency of the motor supply so that the motor operates under maximum torque conditions.

Figure 4:
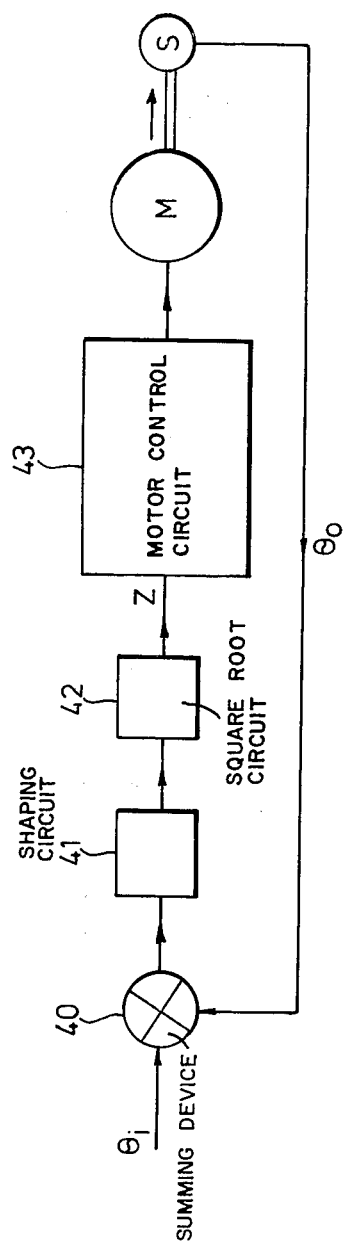
FIG. 4 illustrates one application of the invention.

One application of the invention is illustrated in FIG. 4. This shows the use of the motor control apparatus in a Type 2 position servo in which the torque developed by the motor is proportional to the position error.

As will be seen from FIG. 4, the demanded position input $\theta_i$ is applied via a summing device 40 to an amplifier and wave-shaping circuit 41. Because the torque of the motor varies in proportion to the square root of the motor current, a square-rooting circuit 42 is included between the circuit 41 and the motor control circuit 43, which is of one of the forms described above. The output of the square-rooting circuit 42 forms the input Z of FIG. 1. The control circuit 43 controls the motor M, and a synchro S, driven by the motor, develops a voltage $\theta_o$ which is fed back to the summing device 40.

The motor control apparatus may, of course, be used in many other circuit arrangements.

What we claim is:

1. Electric motor control apparatus for an alternating-current induction motor having a low-resistance rotor and two stator windings 90° apart, which includes a variable frequency oscillator, a counter clocked by the oscillator, signal generating means responsive to the counter output to generate two sinusoidal voltages in quadrature with one another, amplifier means operable to apply each sinusoidal voltage to a separate one of the stator windings under constant current conditions, and control means operable to vary the frequency of the two sinusoidal voltages in such a manner that the torque developed by the motor remains substantially at a maximum value despite changes in the speed of rotation of the motor.

2. Apparatus as claimed in claim 1 in which the control means is operable to compare the phase of the voltage applied across one stator winding with the current flowing in that winding and to vary the frequency of the variable frequency oscillator to maintain a constant phase difference.

3. Apparatus as claimed in claim 2 in which the control means includes a waveform generator operable to generate a signal lagging in phase by 45° behind the sinusoidal voltage applied across said one winding, and a phase sensitive detector responsive to the phase difference between said current and voltage to apply a control signal to the variable-frequency oscillator.

4. Apparatus as claimed in claim 2 in which the signal generating means includes means for generating sine waveform and cosine waveform based on the same mathematical function, the cosine waveform being applied to said one winding.

5. Apparatus as claimed in claim 1 which includes an input terminal to which may be applied an externally generated demand input, and multiplying means operable to multiply the amplitude of each sinusoidal voltage by a quantity determined by the demand input.

6. Apparatus as claimed in claim 5 in which the multiplying means is operable to multiply the sine waveform voltage by the demand input and to multiply the cosine waveform voltage by the modulus of the demand input.

7. Apparatus as claimed in claim 3 in which the signal generated by the waveform generator is a square wave.

8. Apparatus as claimed in claim 1 in which the control means includes measuring means responsive to the speed of rotation of the motor to deliver an electrical signal indicative thereof, and circuit means operable to multiply said signal by a constant value determined by the electrical characteristics of the motor and to apply the resulting signal to the variable-frequency oscillator to control the frequency thereof.

* * * * *